(12) United States Patent
Matano et al.

(10) Patent No.: US 10,815,155 B2
(45) Date of Patent: Oct. 27, 2020

(54) HIGH-ZIRCONIA ELECTROCAST REFRACTORY AND METHOD FOR MANUFACTURING THE SAME

(71) Applicant: AGC CERAMICS CO., LTD., Minato-ku (JP)

(72) Inventors: Kenji Matano, Takasago (JP); Nobuo Tomura, Chiyoda-ku (JP)

(73) Assignee: AGC CERAMICS CO., LTD., Minato-ku (JP)

(*) Notice: Subject to any disclaimer, the term of this patent is extended or adjusted under 35 U.S.C. 154(b) by 0 days.

(21) Appl. No.: 16/124,913

(22) Filed: Sep. 7, 2018

(65) Prior Publication Data
US 2019/0077714 A1    Mar. 14, 2019

(30) Foreign Application Priority Data

Sep. 8, 2017 (JP) ................................ 2017-172924
Jul. 24, 2018 (JP) ................................ 2018-138361

(51) Int. Cl.
*C04B 35/484* (2006.01)
*C03B 5/43* (2006.01)
(Continued)

(52) U.S. Cl.
CPC ............. *C04B 35/484* (2013.01); *C03B 5/43* (2013.01); *C04B 35/05* (2013.01); *C04B 35/48* (2013.01);
(Continued)

(58) Field of Classification Search
CPC ....... C04B 35/484; C04B 35/48; C04B 35/05; C03B 5/43
See application file for complete search history.

(56) References Cited

U.S. PATENT DOCUMENTS 4,705,763 A * 11/1987 Hayashi ................ C04B 35/657
501/103
5,023,218 A   6/1991 Zanoli et al.
(Continued)

FOREIGN PATENT DOCUMENTS

EP    2 418 189 A1    2/2012
EP    2 749 542 A1    7/2014
(Continued)

OTHER PUBLICATIONS

Extended European Search Report dated Nov. 15, 2018 in Patent Application No. 18192492.9, 8 pages.

*Primary Examiner* — Noah S Wiese
(74) *Attorney, Agent, or Firm* — Oblon, McClelland, Maier & Neustadt, L.L.P.

(57) ABSTRACT

To provide a high-zirconia electrocast refractory in which occurrence of cracks in manufacture and occurrence of cracks in use as a furnace material is further reduced while maintaining extremely high corrosion resistance to molten glass. The high-zirconia electrocast refractory contains 96.7 to 98.5 mass % of $ZrO_2$, 0.8 to 2.7 mass % of $SiO_2$, 0 to 0.2 mass % of $Na_2O$, 0.21 to 1 mass % of $K_2O$, 0.1 to 0.4 mass % of $Al_2O_3$, and does not substantially contain $B_2O_3$, in terms of oxide, as a chemical composition, wherein contents of the $Na_2O$ and the $K_2O$ satisfy a relation of following Formula (1)

$$0.15 \text{ mass \%} \leq C_{K2O}/2 + C_{Na2O} \leq 0.6 \text{ mass \%} \quad (1)$$

where $C_{K2O}$ is the content of $K_2O$ and $C_{Na2O}$ is the content of $Na_2O$, and each of the contents is expressed by mass % in the refractory.

10 Claims, 3 Drawing Sheets

(51) Int. Cl.
*C04B 35/05* (2006.01)
*C04B 35/48* (2006.01)
*F27D 1/00* (2006.01)
*C04B 35/66* (2006.01)
*C04B 35/657* (2006.01)

(52) U.S. Cl.
CPC ............ *C04B 35/657* (2013.01); *C04B 35/66* (2013.01); *F27D 1/0006* (2013.01); *C04B 2235/3201* (2013.01); *C04B 2235/3217* (2013.01); *C04B 2235/3418* (2013.01); *C04B 2235/6565* (2013.01); *C04B 2235/72* (2013.01); *C04B 2235/96* (2013.01); *C04B 2235/9607* (2013.01); *C04B 2235/9669* (2013.01)

(56) References Cited

U.S. PATENT DOCUMENTS

| | | | |
|---|---|---|---|
| 5,679,612 A * | 10/1997 | Endo | C04B 35/484 |
| | | | 501/104 |
| 7,129,192 B2 * | 10/2006 | Boussant-Roux | C03B 5/43 |
| | | | 501/105 |
| 7,655,587 B2 | 2/2010 | Boussant-Roux et al. | |
| 7,687,422 B2 | 3/2010 | Boussant-Roux et al. | |
| 8,124,554 B2 * | 2/2012 | Boussant-Roux | C03B 5/43 |
| | | | 501/103 |
| 9,056,797 B2 * | 6/2015 | Ushimaru | C03B 5/43 |
| 2012/0036895 A1 | 2/2012 | Sato | |
| 2012/0295785 A1 * | 11/2012 | Gaubil | C03B 5/43 |
| | | | 501/104 |
| 2013/0125593 A1 | 5/2013 | Gaubil et al. | |
| 2013/0255316 A1 * | 10/2013 | Gaubil | C03B 5/43 |
| | | | 65/33.9 |
| 2014/0187408 A1 | 7/2014 | Ushimaru et al. | |

FOREIGN PATENT DOCUMENTS

| | | |
|---|---|---|
| JP | 55-3319 | 1/1980 |
| JP | 59-12619 | 3/1984 |
| JP | 3-28175 | 2/1991 |
| JP | 2009-527454 | 7/2009 |
| JP | 2014-129199 | 7/2014 |

* cited by examiner

HIGH-ZIRCONIA ELECTROCAST REFRACTORY AND METHOD FOR MANUFACTURING THE SAME

CROSS REFERENCE TO RELATED APPLICATIONS

This application is based upon and claims the benefit of priority from Japanese Patent Applications No. 2017-172924 filed on Sep. 8, 2017, and No. 2018-138361 filed on Jul. 24, 2018; the entire contents of which are incorporated herein by reference.

FIELD

The present invention relates to a high-zirconia electrocast refractory and a method for manufacturing the same and, in particular, to a high-zirconia electrocast refractory suitable for use for a glass melting furnace being a glass manufacturing furnace and a method for manufacturing the same.

BACKGROUND

A high-zirconia electrocast refractory containing 80 mass % or more of $ZrO_2$ as a chemical component has been conventionally used as a refractory for a glass melting furnace. The high-zirconia electrocast refractory has high corrosion resistance and low staining properties with respect to molten glass, and is frequently used for a portion in contact with the molten glass of the glass melting furnace. Such a high-zirconia electrocast refractory is composed of a large amount of zirconia crystal grains and a small amount of matrix glass filling spaces among the crystal grains.

Incidentally, recently, it is increasingly required to further increase the melting temperature of glass, and even the high-zirconia electrocast refractory cannot sufficiently satisfy the corrosion resistance. Hence, a refractory with higher corrosion resistance is required for the glass melting furnace.

In the refractory utilizing the zirconia crystals, to increase the corrosion resistance to the molten glass at high temperature, generally it is only necessary to increase the content of $ZrO_2$ in the refractory, and various high-zirconia electrocast refractories improved in corrosion resistance are under consideration. As the high-zirconia electrocast refractories, concretely, there are known high-zirconia electrocast refractories increased in content of $ZrO_2$ up to 90 mass % or more, further up to 95 mass % or more (refer to, for example, JP-A H3-028175, JP-B S59-012619, JP-A 2009-527454, JP-B S55-003319).

In the high-zirconia electrocast refractory containing 95 mass % or more of $ZrO_2$, the matrix glass is 5 mass % at a maximum that is low in percentage to the whole refractory. However, the physical property of the matrix glass greatly contributes to a decrease in characteristics of the refractory, for example, the residual volume expansion (hereinafter, abbreviated as residual expansion) and prevention of cracks in manufacture. Therefore, in the high-zirconia electrocast refractory, it is important to adjust an optimal glass composition of the matrix glass, in particular, to adjust the contents of minor components.

Further, a high-zirconia electrocast refractory with the content of zirconia of 96 mass % or more becomes likely to cause cracks therein, and is difficult to manufacture in a size usable for the furnace material of the glass furnace. Usually, the high-zirconia electrocast refractory is manufactured by melting the raw material of the refractory to a higher temperature of 2500° C. or higher and cooling it in a mold. When the content of zirconia in the refractory becomes high, the melting temperature of the raw material further increases, thus making cracks likely to occur when a large-size refractory is manufactured.

In recent years, there is a known high-zirconia electrocast refractory improved in corrosion resistance to an extremely high level as described above, and it is expected to provide a refractory in which cracks do not occur in manufacturing a large-size refractory and in use as the furnace material of the glass furnace.

Regarding the above, the present inventors have found that a high-zirconia electrocast refractory containing 96.5 to 98.5 mass % of $ZrO_2$, 0.8 to 2.7 mass % of $SiO_2$, 0.04 to 0.35 mass % of $Na_2O$ and $K_2O$ in total, 0.02 to 0.18 mass % of $B_2O_3$, in terms of oxide, as a chemical composition, the contents of $Na_2O$, $K_2O$, and $B_2O_3$ satisfying a predetermined relation may contain $Al_2O_3$ and can solve the above problem of enabling suppression of occurrence of cracks in manufacturing the same and preventing occurrence of cracks in use for the furnace material while having extremely high corrosion resistance to the molten glass (refer to JP-A 2014-129199).

SUMMARY

In such circumstances, a high-zirconia electrocast refractory is required which is excellent in manufacturing cost and enables stable use also in use by reducing the residual expansion and suppressing cracks in manufacture.

An object of the present invention is to provide a high-zirconia electrocast refractory in which occurrence of cracks in manufacture and occurrence of cracks in use as a furnace material is further reduced while maintaining extremely high corrosion resistance to molten glass, and a method for manufacturing the same.

As a result of earnest investigations, the present inventors have found a high-zirconia electrocast refractory which is a refractory with a content of $ZrO_2$ set to 96.7 mass % or more by optimizing the refractory composition and having high corrosion resistance to the molten glass in which occurrence of cracks in manufacture can be suppressed even when the refractory is large in size and the residual expansion of the refractory is small.

More specifically, a high-zirconia electrocast refractory of the present invention contains 96.7 to 98.5 mass % of $ZrO_2$, 0.8 to 2.7 mass % of $SiO_2$, 0.1 to 0.4 mass % of $Al_2O_3$, 0 to 0.2 mass % of $Na_2O$, and 0.21 to 1 mass % of $K_2O$, and does not substantially contain $B_2O_3$, in terms of oxide, as a chemical composition, wherein contents of the $Na_2O$ and the $K_2O$ satisfy a relation of following Formula (1)

$$0.15 \text{ mass \%} \leq C_{K2O}/2 + C_{Na2O} \leq 0.6 \text{ mass \%} \tag{1}$$

where $C_{K2O}$ is the content of $K_2O$ and $C_{Na2O}$ is the content of $Na_2O$, and each of the contents is expressed by mass % in the refractory.

According to the high-zirconia electrocast refractory and the method for manufacturing the same of the present invention, the content of $ZrO_2$ is high, and therefore high corrosion resistance is exhibited to the molten glass, and the contents of components other than the $ZrO_2$ component are optimized, and therefore occurrence of cracks can be suppressed in manufacturing a large-size high-zirconia electrocast refractory, and the residual expansion of the refractory can be made small.

DETAILED DESCRIPTION

Figure 1A:
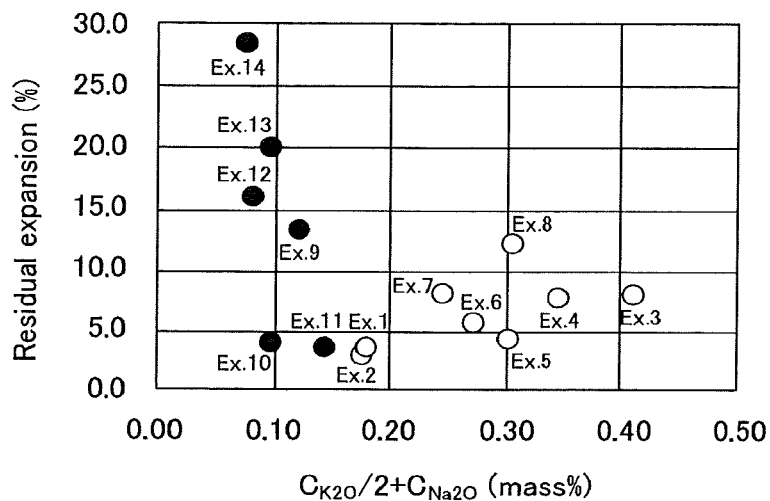
FIG. 1A is a graph representing a relation between ($C_{K2O}/2 + C_{Na2O}$) and residual expansion about high-zirconia electrocast refractories in examples and comparative examples.

A high-zirconia electrocast refractory of the present invention is a high-zirconia electrocast refractory containing predetermined components at a predetermined compounding ratio as described above, and is composed of a large amount of zirconia crystals, a small amount of matrix glass, and few pores. The roles played in the refractory by chemical components contained in the refractory will be explained below referring to an embodiment.

In the high-zirconia electrocast refractory of this embodiment, $ZrO_2$ is a component which increases the corrosion resistance of the refractory to molten glass and is an essential component.

The content of $ZrO_2$ is 96.7 to 98.5 mass % in the high-zirconia electrocast refractory. The high-zirconia electrocast refractory containing 96.7 mass % or more of $ZrO_2$ becomes a refractory excellent in corrosion resistance to the molten glass as compared with the conventional high-zirconia electrocast refractory. On the other hand, when the content exceeds 98.5 mass %, the contents of the matrix glass and other components become too small, causing cracks to become more likely to occur in manufacture and resulting in difficulty in increasing the size of the refractory.

The content of $ZrO_2$ is preferably 96.9 to 98.2 mass % and more preferably 97.2 to 98 mass % from the viewpoints of ensuring the content of the matrix glass while maintaining high durability to the molten glass.

Note that a zirconia raw material and a zircon raw material used for manufacturing the high-zirconia electrocast refractory inevitably contain 1 to 3 mass % of $HfO_2$. In addition, $HfO_2$ is rarely lost such as evaporation in manufacture but remains in the refractory, and therefore an ordinary high-zirconia electrocast refractory also contains $HfO_2$ derived from the raw material. Since $HfO_2$ plays the same role as $ZrO_2$ in the high-zirconia electrocast refractories in general, the value of $ZrO_2+HfO_2$ is usually expressed simply as $ZrO_2$. Also in this specification, the value of $ZrO_2+HfO_2$ is expressed simply as $ZrO_2$.

In the high-zirconia electrocast refractory of this embodiment, $SiO_2$ is a component forming the matrix glass and is an essential component.

The content of $SiO_2$ is 0.8 to 2.7 mass % in the high-zirconia electrocast refractory. The high-zirconia electrocast refractory containing 0.8 mass % or more of $SiO_2$ can mitigate the thermal stress with respect to the temperature change in manufacture and prevent cracks. On the other hand, with a content of more than 2.7 mass %, the percentage of $SiO_2$ in the matrix glass becomes high and the viscosity of the matrix glass increases, possibly causing cracks to occur in manufacturing the refractory. The content of $SiO_2$ is preferably 1 to 2.4 mass % and more preferably 1.2 to 2.1 mass %.

In the high-zirconia electrocast refractory of this embodiment, $Al_2O_3$ is a component which decreases the viscosity of the matrix glass and is a component which suppresses generation of zircon in the refractory, and is an essential component. A part of the matrix glass reacts with the zirconia crystals to generate zircon. When zircon is generated, the amount of the matrix glass in the refractory decreases, so that the matrix glass may fail to sufficiently exhibit its function. Further, the decrease of the matrix glass increases the residual expansion of the refractory, possibly causing occurrence of cracks during use as a furnace material of a glass furnace.

The content of $Al_2O_3$ is 0.1 to 0.4 mass % in the high-zirconia electrocast refractory. In this embodiment, the amount of the matrix glass is small with respect to the zirconia crystals, so that $Al_2O_3$ can exhibit effects with a content of 0.1 mass % or more. On the other hand, with a content of 0.4 mass % or more, aluminosilicate-based crystals such as mullite is generated in manufacture and during use of the refractory, possibly causing fracture to occur in the refractory. The content of $Al_2O_3$ is preferably 0.2 to 0.3 mass %.

In the high-zirconia electrocast refractory of this embodiment, $Na_2O$ and $K_2O$ are components which can suppress occurrence of cracks in manufacturing the refractory. In this embodiment, $Na_2O$ is an arbitrary component and its content is preferably 0 to 0.2 mass %, more preferably 0 to 0.15 mass %, and furthermore preferably 0 to 0.12 mass % in the high-zirconia electrocast refractory.

On the other hand, in this embodiment, $K_2O$ is an essential component and its content is preferably 0.21 to 1 mass %, more preferably 0.21 to 0.9 mass %, and furthermore preferably 0.3 to 0.75 mass % in the high-zirconia electrocast refractory. $K_2O$ is contained as an essential component and thereby can decrease the viscosity of the matrix glass in manufacture to prevent cracks. Further, it is possible to prevent generation of zircon in the matrix glass when used as the furnace material of the glass furnace to prevent cracks.

Then, these $Na_2O$ and $K_2O$ are compounded so that the contents of $Na_2O$ and $K_2O$ in the high-zirconia electrocast refractory satisfy the relation of following Formula (1)

$$0.15 \text{ mass \%} \le C_{K2O}/2+C_{Na2O} \le 0.6 \text{ mass \%} \quad (1)$$

where $C_{K2O}$ is the content of $K_2O$ and $C_{Na2O}$ is the content of $Na_2O$, and each of the contents is expressed by mass % in the refractory.

When the ($C_{K2O}/2+C_{Na2O}$) is set to 0.15 mass % or more, generation of zircon in the refractory is suppressed, which contributes to suppression of occurrence of cracks in manufacturing the refractory. With a higher value thereof, the viscosity of the matrix glass can be made lower, but with too much alkaline components, vitrification becomes difficult. Therefore, the ($C_{K2O}/2+C_{Na2O}$) is 0.6 mass % or less for adjusting the contents of other components in the matrix glass.

The ($C_{K2O}/2+C_{Na2O}$) is preferably 0.15 to 0.55 mass %, and more preferably 0.2 to 0.45 mass %. Note that the reason why the content of $K_2O$ is divided by 2 in this value is that the balance to the action of $Na_2O$ on the influence to cracks and residual expansion is taken into consideration.

Further, as for $Na_2O$, $K_2O$, and $SiO_2$, it is preferable that the contents of $Na_2O$, $K_2O$, and $SiO_2$ in the high-zirconia electrocast refractory satisfy the relation of following Formula (2)

$$0.09 \leq (C_{K2O}/2 + C_{Na2O})/C_{SiO2} \leq 0.4 \quad (2)$$

where $C_{Na2O}$ is the content of $Na_2O$, $C_{K2O}$ is the content of $K_2O$, and $C_{SiO2}$ is the content of $SiO_2$, and each of the contents is expressed by mass % in the refractory.

When the $[(C_{K2O}/2 + C_{Na2O})/C_{SiO2}]$ is set to 0.09 or more, generation of zircon in the refractory is suppressed, which contributes to suppression of occurrence of cracks in manufacturing the refractory. With a higher value thereof, the viscosity of the matrix glass can be made lower, but with too much alkaline components, vitrification becomes difficult. Therefore, the $[(C_{K2O}/2 + C_{Na2O})/C_{SiO2}]$ is 0.4 or less for adjusting the contents of the other components in the matrix glass.

The $[(C_{K2O}/2 + C_{Na2O})/C_{SiO2}]$ is preferably 0.09 to 0.3, and more preferably 0.12 to 0.27.

Further, as for $Na_2O$, $K_2O$, and $SiO_2$, it is preferable that the contents of $Na_2O$, $K_2O$, and $SiO_2$ in the high-zirconia electrocast refractory satisfy the relation of following Formula (3)

$$0.11 \leq (C_{K2O}/1.5 + C_{Na2O})/C_{SiO2} \leq 0.5 \quad (3)$$

where $C_{Na2O}$ is the content of $Na_2O$, $C_{K2O}$ is the content of $K_2O$, and $C_{SiO2}$ is the content of $SiO_2$, and each of the contents is expressed by mass % in the refractory.

When the $[(C_{K2O}/1.5 + C_{Na2O})/C_{SiO2}]$ is set to 0.11 or more, generation of zircon in the refractory is suppressed, which contributes to suppression of occurrence of cracks in manufacturing the refractory. With a higher value thereof, the viscosity of the matrix glass can be made lower, but with too much alkaline components, vitrification becomes difficult.

Therefore, the $[(C_{K2O}/1.5 + C_{Na2O})/C_{SiO2}]$ is 0.5 or less for adjusting the contents of the other components in the matrix glass.

The $[(C_{K2O}/1.5 + C_{Na2O})/C_{SiO2}]$ is preferably 0.11 to 0.4, and more preferably 0.14 to 0.35. This Formula (3) is different from Formula (1) only in that $C_{K2O}$ is divided by 1.5, and $K_2O$ has a molar mass of about 1.5 times that of $Na_2O$. Therefore, by the mass basis, the effect to be evaluated based on their contents can be more accurately evaluated. Note that this tendency is almost equal between Formula (1) and Formula (3).

Further, as for $Na_2O$ and $K_2O$, it is preferable that the contents of $Na_2O$ and $K_2O$ in the high-zirconia electrocast refractory satisfy the relation of following Formula (4)

$$2 \leq C_{K2O}/C_{Na2O} \quad (4)$$

where $C_{K2O}$ is the content of $K_2O$ and $C_{Na2O}$ is the content of $Na_2O$, and each of the contents is expressed by mass % in the refractory.

When the ratio between $Na_2O$ and $K_2O$ ($C_{K2O}/C_{Na2O}$) is 2 or more, it is possible to effectively suppress occurrence of cracks and increase in residual expansion of the refractory. This ratio ($C_{K2O}/C_{Na2O}$) is preferably 2 to 11 and more preferably 3.5 to 8. More specifically, the residual volume expansion rate of the high-zirconia electrocast refractory to be manufactured can be made 20% or less, which is preferable in terms of being able to effectively suppress occurrence of cracks when it is used as the furnace material of the glass furnace. Note that in this specification, the residual volume expansion rate is a volume variation derived from a dimensional variation between before and after a thermal cycle test, the thermal cycle test imparting a temperature change of reciprocating a sample between 800° C. and 1250° C. 40 times. More specifically, the residual volume expansion rate can be calculated from the following expression.

Residual volume expansion rate (%)=((volume after thermal cycle test/volume before thermal cycle test)−1)×100

The high-zirconia electrocast refractory of this embodiment does not substantially contain $B_2O_3$. Here, "not substantially contain" means "not intentionally contain a component" and means "permit mixture of inevitable impurities". When the content is 0.01 mass % or less, it can be said that $B_2O_3$ is not substantially contained.

The $B_2O_3$ is known to have an effect of suppressing occurrence of cracks in manufacturing the high-zirconia electrocast refractory as described above, and is a component to be usually contained in consideration of productivity in this field. However, it has been found that in this embodiment containing $K_2O$ as an essential component, $B_2O_3$ and $K_2O$ may concurrently evaporate due to the coexistence of $B_2O_3$ and $K_2O$. More specifically, it has been found that when $K_2O$ and $B_2O_3$ coexist, the effect of suppressing occurrence of cracks tends to decrease as compared with their compounding amounts. Therefore, $B_2O_3$ is not substantially contained in this embodiment.

In the high-zirconia electrocast refractory of this embodiment, $P_2O_5$ is a component which adjusts the viscosity of the matrix glass and suppresses cracks in manufacturing the refractory, and is not an essential component.

The content of $P_2O_5$ is preferably 0.03 to 0.15 mass % in the high-zirconia electrocast refractory from the above viewpoint. In this case, when a small amount of $P_2O_5$ is contained, its effect can be exhibited. The content of $P_2O_5$ is preferably 0.03 to 0.12 mass % and more preferably 0.03 to 0.06 mass %.

On the other hand, when $P_2O_5$ is contained, the generation of zircon may be promoted, so that a smaller content of $P_2O_5$ is more preferable from the viewpoints of chipping off and residual expansion. The content is more preferably 0.04 mass % or less in the high-zirconia electrocast refractory, and not substantially containing $P_2O_5$ is particularly preferable. Also as for $P_2O_5$, when the content is 0.01 mass % or less, it can be said that $P_2O_5$ is not substantially contained.

In the high-zirconia electrocast refractory of this embodiment, CuO is a component which may color the molten glass and, when contained concurrently with the above $P_2O_5$ and $B_2O_3$, may form low-melting glass to decrease the chemical durability. Accordingly, it is preferable that the present invention does not substantially contain CuO.

Besides, $Fe_2O_3$ and $TiO_2$ may be contained as impurities in the raw material. These components are components which cause coloring and foaming of the molten glass, and their high contents are not preferable. The total of the contents of $Fe_2O_3$ and $TiO_2$ of 0.3 mass % or less causes no coloring problem and is preferably 0.2 mass % or less.

Similarly, MgO and CaO may be contained as impurities in the raw material. These components are likely to increase the residual expansion in the thermal cycle test. The content of each of MgO and CaO of 0.05 mass % or less causes no problem, and is preferably 0.03 mass % or less.

Similarly, $Y_2O_3$ may be contained as an impurity depending on the raw material. When $Y_2O_3$ is contained in the refractory, the matrix glass becomes hard and tends to increase the residual expansion in the thermal cycle test. The content of $Y_2O_3$ of 0.3 mass % or less causes no problem, and is preferably 0.2 mass % or less.

The bulk specific gravity of the high-zirconia electrocast refractory is preferably 5.4 g/cm³ or more. The high-zirconia electrocast refractory of the present embodiment is more preferable when it is higher in corrosion resistance to the molten glass and it is denser. Accordingly, the bulk specific gravity is more preferably 5.45 to 5.55 g/cm³.

The porosity of the high-zirconia electrocast refractory is preferably 1.5% or less. The high-zirconia electrocast refractory of the present embodiment is more preferable as its corrosion resistance to the molten glass is higher. Since the porosity influences the corrosion resistance characteristic, a lower porosity is more preferable. Accordingly, the porosity is more preferably 0.1 to 1%.

The mass of the high-zirconia electrocast refractory is preferably 200 kg or more. The high-zirconia electrocast refractory of the embodiment invention can suppress occurrence of cracks in the refractory also in manufacturing such a large-size electrocast refractory, and can drastically improve the yields of large-size products as compared with the prior art. The mass is more preferably 400 to 1500 kg.

Examples

Hereinafter, the high-zirconia electrocast refractory of the present invention will be concretely explained using examples (Example 1 to Example 8) and comparative examples (Example 9 to Example 14), but the present invention should not be construed limited to them.

To obtain the refractory by the electrofusion casting method, raw materials such as alumina, zircon sand, silica, sodium carbonate, potassium carbonate, $B_2O_3$ were compounded into desiliconized zircon being the zirconia raw material to prepare a raw material mixture, and the raw material mixture was charged into a three-phase arc electric furnace having an output of 1500 kVA equipped with three graphite electrodes and completely melted by energization heating.

600 kg of molten material was poured into and cast in a mold made of graphite embedded in advance in silica sand being an insulating material, and let stand to cool to a temperature near room temperature. The mold made of graphite was produced to provide a material of a refractory product of 200 mm thick×400 wide×900 mm high and containing no shrinkage cavity. More specifically, the mold was designed and produced so as to provide an ingot in which a feeder head portion having the same volume as that of the portion for the material of the refractory product is provided above the portion for the material of the refractory product.

After the casting and standing to cool, the ingot and the graphite mold were taken out from the insulating material, and the graphite mold and the ingot were separated to thereby manufacture the high-zirconia electrocast refractory.

The raw material compositions were prepared to obtain high-zirconia electrocast refractories having chemical compositions listed in Table 1. Here, examples are Example 1 to Example 8, and comparative examples are Example 9 to Example 14. Further, relations between relational expressions and physical properties about examples and comparative examples are listed in Table 2. Note that the chemical composition in the refractory is basically a quantitative analysis value decided by the wavelength-dispersive fluorescent X-ray analysis method, but $B_2O_3$ and $P_2O_5$ requiring accuracy are quantitative analysis values decided by the high-frequency inductively coupled plasma emission spectrochemical analysis method. However, the quantitative determination of the components is not limited to these analysis methods but may be performed by other quantitative analysis methods.

TABLE 1

| | Composition (mass %) | | | | | | | | | |
|---|---|---|---|---|---|---|---|---|---|---|
| | $SiO_2$ | $Al_2O_3$ | $Fe_2O_3$ | $TiO_2$ | $ZrO_2$ | CaO | MgO | $Na_2O$ | $K_2O$ | $B_2O_3$ |
| Exam. 1 | 1.9 | 0.26 | 0.075 | 0.12 | 97.3 | 0.04 | 0.00 | 0.06 | 0.24 | 0.00 |
| Exam. 2 | 1.8 | 0.28 | 0.028 | 0.12 | 97.4 | 0.05 | 0.00 | 0.03 | 0.29 | 0.00 |
| Exam. 3 | 2.1 | 0.34 | 0.022 | 0.13 | 96.7 | 0.07 | 0.00 | 0.11 | 0.60 | 0.00 |
| Exam. 4 | 1.9 | 0.31 | 0.029 | 0.14 | 97.0 | 0.06 | 0.00 | 0.10 | 0.49 | 0.00 |
| Exam. 5 | 2.0 | 0.28 | 0.026 | 0.13 | 97.0 | 0.05 | 0.00 | 0.10 | 0.40 | 0.00 |
| Exam. 6 | 2.1 | 0.30 | 0.02 | 0.11 | 97.0 | 0.04 | 0.00 | 0.06 | 0.42 | 0.00 |
| Exam. 7 | 1.6 | 0.26 | 0.018 | 0.11 | 97.5 | 0.05 | 0.00 | 0.05 | 0.39 | 0.00 |
| Exam. 8 | 1.6 | 0.31 | 0.02 | 0.13 | 97.3 | 0.06 | 0.00 | 0.05 | 0.51 | 0.00 |
| Exam. 9 | 1.8 | 0.42 | 0.026 | 0.17 | 97.4 | 0.04 | 0.00 | 0.12 | 0.00 | 0.05 |
| Exam. 10 | 1.9 | 0.32 | 0.022 | 0.13 | 97.1 | 0.05 | 0.00 | 0.04 | 0.11 | 0.00 |
| Exam. 11 | 1.8 | 0.27 | 0.035 | 0.13 | 97.5 | 0.05 | 0.01 | 0.04 | 0.20 | 0.00 |
| Exam. 12 | 1.7 | 0.32 | 0.037 | 0.15 | 97.6 | 0.09 | 0.00 | 0.07 | 0.02 | 0.06 |
| Exam. 13 | 1.9 | 0.32 | 0.046 | 0.17 | 97.3 | 0.09 | 0.00 | 0.09 | 0.01 | 0.08 |
| Exam. 14 | 1.9 | 0.34 | 0.042 | 0.17 | 97.3 | 0.10 | 0.00 | 0.07 | 0.01 | 0.07 |

TABLE 2

| | Relational expression reference data | | | | | Total length of cracks (mm) | Residual expansion (%) | Determination | | |
|---|---|---|---|---|---|---|---|---|---|---|
| | $C_{K2O}/2 + C_{Na2O}$ | $C_{K2O}/1.5 + C_{Na2O}$ | $(C_{K2O}/2 + C_{Na2O})/C_{SiO2}$ | $(C_{K2O}/1.5 + C_{Na2O})/C_{SiO2}$ | $C_{K2O}/ C_{Na2O}$ | | | Cracks | Residual expansion | Comprehension |
| Exam. 1 | 0.180 | 0.220 | 0.095 | 0.116 | 4.00 | 250 | 3.8 | Good | Excellent | Good |
| Exam. 2 | 0.175 | 0.223 | 0.097 | 0.124 | 9.67 | 255 | 3.0 | Good | Excellent | Good |
| Exam. 3 | 0.410 | 0.510 | 0.195 | 0.243 | 5.45 | 87 | 8.2 | Excellent | Excellent | Excellent |
| Exam. 4 | 0.345 | 0.427 | 0.182 | 0.225 | 4.90 | 56 | 7.7 | Excellent | Excellent | Excellent |
| Exam. 5 | 0.300 | 0.367 | 0.150 | 0.183 | 4.00 | 138 | 4.4 | Excellent | Excellent | Excellent |
| Exam. 6 | 0.270 | 0.340 | 0.129 | 0.162 | 7.00 | 61 | 5.9 | Excellent | Excellent | Excellent |

TABLE 2-continued

| | Relational expression reference data | | | | | Total length of cracks (mm) | Residual expansion (%) | Determination | | |
| --- | --- | --- | --- | --- | --- | --- | --- | --- | --- | --- |
| | $C_{K2O}/2 + C_{Na2O}$ | $C_{K2O}/1.5 + C_{Na2O}$ | $(C_{K2O}/2 + C_{Na2O})/C_{SiO2}$ | $(C_{K2O}/1.5 + C_{Na2O})/C_{SiO2}$ | $C_{K2O}/C_{Na2O}$ | | | Cracks | Residual expansion | Comprehension |
| Exam. 7 | 0.245 | 0.310 | 0.153 | 0.194 | 7.80 | 70 | 8.2 | Excellent | Excellent | Excellent |
| Exam. 8 | 0.305 | 0.390 | 0.191 | 0.244 | 10.20 | 104 | 12.3 | Excellent | Good | Good |
| Exam. 9 | 0.120 | 0.120 | 0.067 | 0.067 | 0.00 | 425 | 13.3 | Fair | Good | Fair |
| Exam. 10 | 0.095 | 0.113 | 0.050 | 0.060 | 2.75 | 840 | 4.2 | Poor | Excellent | Poor |
| Exam. 11 | 0.140 | 0.173 | 0.078 | 0.096 | 5.00 | 702 | 3.7 | Poor | Excellent | Poor |
| Exam. 12 | 0.080 | 0.083 | 0.047 | 0.049 | 0.286 | 245 | 15.9 | Good | Good | Good |
| Exam. 13 | 0.095 | 0.097 | 0.050 | 0.051 | 0.111 | 241 | 20.1 | Good | Fair | Fair |
| Exam. 14 | 0.075 | 0.077 | 0.039 | 0.040 | 0.143 | 582 | 28.4 | Fair | Fair | Fair |

[Cracks]
Cracks in terms of appearance of the ingot were evaluated as follows.
The feeder head portion was cut off from the ingot of the high-zirconia electrocast refractory and an electrocast refractory of 200 mm thick×400 wide×900 mm high (mass: about 400 kg) was manufactured. The lengths of all of the cracks visually confirmed on the surface of the electrocast refractory were measured, and their total length was evaluated according to the following criteria.

Excellent: the total length of cracks is 150 mm or less.
Good: the total length of cracks is more than 150 mm and 300 mm or less.
Fair: the total length of cracks is more than 300 mm and 600 mm or less.
Poor: the total length of cracks is more than 600 mm.

[Residual Expansion]
A sample of 50 mm thick×50 mm wide×50 mm high was cut off from the manufactured electrocast refractory and subjected to heating and cooling of repetition between 800° C. and 1250° C. 40 times in the electric furnace. In this event, the heating from room temperature to 800° C. was performed at 160° C. per hour, then after reaching 800° C., the heating to 1250° C. was performed at 450° C. per hour, and immediately after reaching 1250° C., the cooling down to 800° C. was performed at 450° C. per hour, as one thermal cycle. Thereafter, in the same operation as above, the thermal cycle of reciprocation between 800° C. and 1250° C. was repeated 40 times. After the final thermal cycle, cooling was performed at a rate of 160° C. per hour from 800° C. down to room temperature. The dimensions of the sample before and after the test were measured, and the residual volume expansion rate was found from the change in dimensions. The residual volume expansion rate obtained at this time was evaluated according to the following criteria.

Excellent: the residual volume expansion rate is 10% or less.
Good: the residual volume expansion rate is more than 10% and 20% or less.
Fair: the residual volume expansion rate is more than 20% and 30% or less.
Poor: the residual volume expansion rate is more than 30%.

[Comprehensive Determination]
Comprehensive determination was made according to the following criteria in accordance with the above evaluation results of the cracks and residual volume expansion rate.

Excellent: both the cracks and the residual volume expansion rate are excellent.
Good: one of the cracks and the residual volume expansion rate is good and the other is not fair nor poor.
Fair: one of the cracks and the residual volume expansion rate is fair and the other is not poor.
Poor: one of the cracks and the residual volume expansion rate is poor.

Figure 1B:
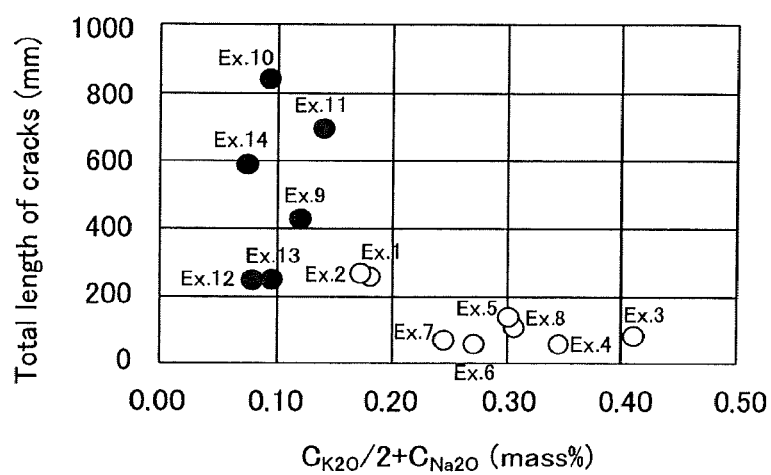
FIG. 1B is a graph representing a relation between ($C_{K2O}/2+C_{Na2O}$) and crack total length about the high-zirconia electrocast refractories in the examples and the comparative examples.
Figure 2A:
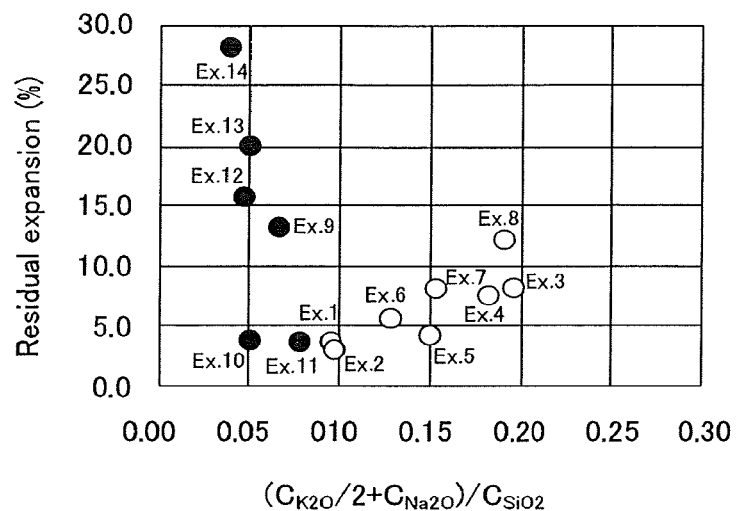
FIG. 2A is a graph representing a relation between [($C_{K2O}/2+C_{Na2O})/C_{SiO2}$] and residual expansion about electrocast refractories in the examples and the comparative examples.
Figure 2B:
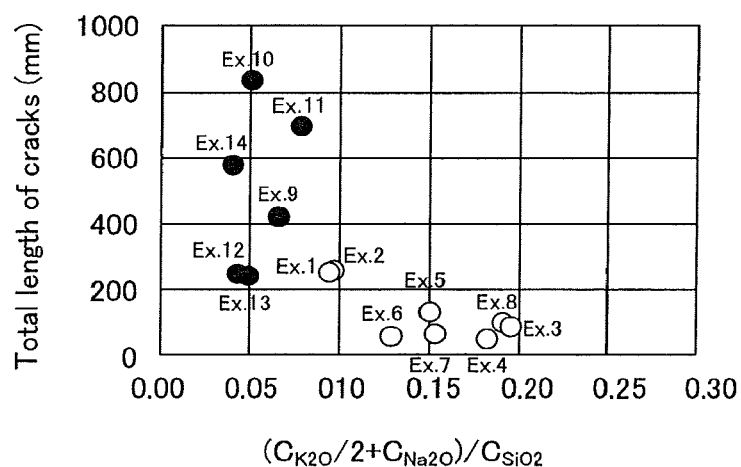
FIG. 2B is a graph representing a relation between [($C_{K2O}/2+C_{Na2O})/C_{SiO2}$] and crack total length about the electrocast refractories in the examples and the comparative examples.
Figure 3A:
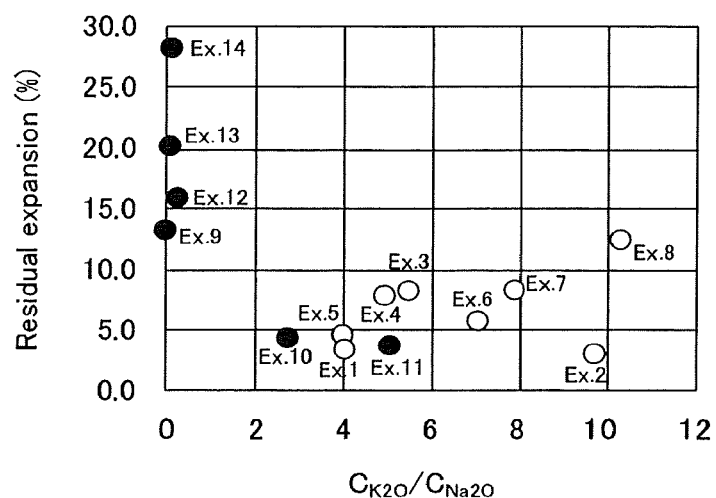
FIG. 3A is a graph representing a relation between $C_{K2O}/C_{Na2O}$ and residual expansion about the electrocast refractories in the examples and the comparative examples.
Figure 3B:
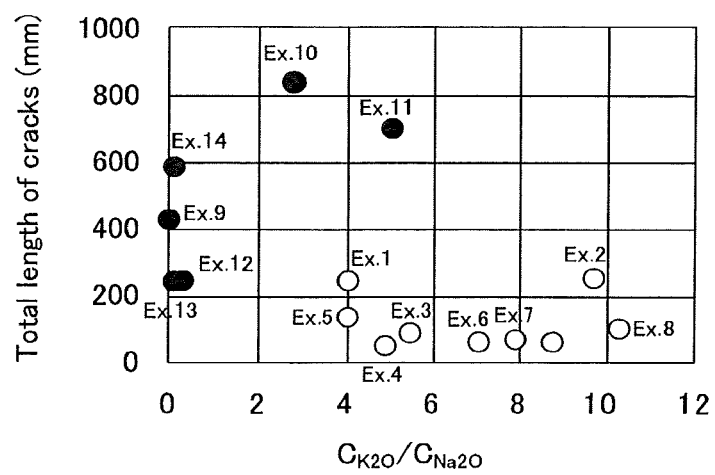
FIG. 3B is a graph representing a relation between $C_{K2O}/C_{Na2O}$ and crack total length about the electrocast refractories in the examples and the comparative examples.

The above-described test results are listed together in Table 1 to Table 2. Further, for the numerical values of the relational expressions of the above Formula (1), Formula (2), and Formula (4), each relation between the residual volume expansion rate and the total length of cracks was illustrated in FIGS. 1A to 3B.

As is clear from Tables 1 to 2, the high-zirconia electrocast refractories in Examples 1 to 8 excellent in corrosion resistance are short in total length of cracks occurring in the manufactured ingots, and therefore it is possible to improve the manufacturing efficiency and also to manufacture large-size cast refractories. Further, the high-zirconia electrocast refractories are small in residual expansion rate and high in cracking resistance to temperature change in use, and therefore can be made long-life-electrocast refractories.

Further, high-zirconia electrocast refractories not corresponding to the present invention are listed as comparative examples in Tables 1 to 2.

The refractories in Examples 9 to 14 are relatively low in contents of $Na_2O$ and $K_2O$ and are therefore extremely long in total length of cracks, high in residual expansion rate, more likely to cause cracks in manufacture, and low in cracking resistance to temperature change in use. Accordingly, these refractories may cause a problem in productivity or usable life.

From the above results, the high-zirconia electrocast refractory of the present invention is a stable refractory which is excellent in productivity though it is extremely high in content of zirconia, is also low in residual expansion rate, and suppressed in occurrence of cracks both in manufacture and in use.

The high-zirconia electrocast refractory of the present invention has high corrosion resistance, rarely causes cracks also in manufacture and in use, and is free from contaminating the molten glass even when it is applied to a glass melting furnace, and it is therefore suitable particularly as a refractory of the glass melting furnace.

What is claimed is:
1. A high-zirconia electrocast refractory comprising: 96.7 to 98.5 mass % of $ZrO_2$,
0.8 to 2.7 mass % of $SiO_2$,
0.1 to 0.4 mass % of $Al_2O_3$,
0 to 0.2 mass % of $Na_2O$,
0.21 to 1 mass % of $K_2O$, and
$Y_2O_3$ in an amount of 0.2 mass % or less, said electrocast refractory not substantially containing $B_2O_3$, in terms of oxide, as a chemical composition, wherein contents of the $Na_2O$ and the $K_2O$ satisfy, a relation of Formula (1)

$$0.15 \text{ mass \%} \leq C_{K2O}/2 + C_{Na2O} \leq 0.6 \text{ mass \%} \quad (1)$$

where $C_{K2O}$ is the content of $K_2O$ and $C_{Na2O}$ is the content of $Na_2O$, and each of the contents is expressed by mass % in the refractory, wherein a ratio of the $C_{K2O}$ to the $C_{Na2O}$ ($C_{K2O}/C_{Na2O}$) is 2 or more.

2. The high-zirconia electrocast refractory according to claim 1, wherein contents of the $Na_2O$, the $K_2O$, and the $SiO_2$ satisfy a relation of Formula (2)

$$0.09 \leq (C_{K2O}/2 + C_{Na2O})/C_{SiO2} \leq 0.4 \quad (2)$$

where $C_{K2O}$ is the content of $K_2O$, $C_{Na2O}$ is the content of $Na_2O$, and $C_{SiO2}$ is the content of $SiO_2$, and each of the contents is expressed by mass % in the refractory.

3. The high-zirconia electrocast refractory according to claim 1, wherein a bulk specific gravity is 5.4 or more.

4. The high-zirconia electrocast refractory according to claim 1, wherein a porosity is 1.5% or less.

5. The high-zirconia electrocast refractory according to claim 1, wherein a mass thereof is 200 kg or more.

6. A method for manufacturing a high-zirconia electrocast refractory, the method comprising:
   melting a refractory raw material at high temperature and cooling the refractory raw material in a mold to manufacture the high-zirconia electrocast refractory according to claim 1.

7. The high-zirconia electrocast refractory according to claim 1, comprising 0 to 0.11 mass % of $Na_2O$.

8. The high-zirconia electrocast refractory according to claim 1, comprising 0 to 0.10 mass % of $Na_2O$.

9. The high-zirconia electrocast refractory according to claim 1, further comprising CaO, in an amount of 0.07 mass % or less.

10. The high-zirconia electrocast refractory according to claim 1, comprising 0.8 to 1.9 mass % of $SiO_2$.

* * * * *